United States Patent
Cilibrasi

(10) Patent No.: US 9,417,842 B2
(45) Date of Patent: Aug. 16, 2016

(54) IDEMPOTENT REPRESENTATION OF NUMBERS IN EXTENSIBLE LANGUAGES

(71) Applicant: Empire Technology Development LLC, Wilmington, DE (US)

(72) Inventor: Rudi Cilibrasi, Sunnyvale, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/006,071

(22) PCT Filed: Mar. 1, 2013

(86) PCT No.: PCT/US2013/028593
§ 371 (c)(1),
(2) Date: Sep. 18, 2013

(87) PCT Pub. No.: WO2014/133542
PCT Pub. Date: Sep. 4, 2014

(65) Prior Publication Data
US 2015/0378676 A1   Dec. 31, 2015

(51) Int. Cl.
G06F 7/483 (2006.01)
G06F 7/38 (2006.01)
G06F 17/30 (2006.01)
G06F 9/44 (2006.01)
G06F 9/45 (2006.01)

(52) U.S. Cl.
CPC *G06F 7/483* (2013.01); *G06F 7/38* (2013.01); *G06F 8/20* (2013.01); *G06F 8/41* (2013.01); *G06F 9/44* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 2003/0046317 A1* | 3/2003 | Cseri | G06F 17/218 715/234 |
| 2005/0278616 A1 | 12/2005 | Eller | |
| 2006/0053191 A1 | 3/2006 | Dahms et al. | |
| 2008/0010313 A1 | 1/2008 | Thede | |
| 2013/0125101 A1* | 5/2013 | Pamer | G06F 8/437 717/141 |
| 2013/0326189 A1* | 12/2013 | Cilibrasi | G06F 9/4401 711/208 |
| 2015/0378676 A1* | 12/2015 | Cilibrasi | G06F 7/38 708/495 |

FOREIGN PATENT DOCUMENTS

WO   0026822 A1   5/2000

OTHER PUBLICATIONS

Wikipedia, Floating Poing, accessed online via http://en.wikipedia.org/wiki/Floating_point on May 17, 2013.
Wikipedia, IEEE 754 revision, accessed online via http://en.wikipedia.org/wiki/IEEE_754_revision on May 17, 2013.
Kamthan, P., XML Euphoria in Perspective, Irt.org, Feb. 7, 2000, pp. 1-11, accessed online via www.irt.org/articles/js203 on May 14, 2012.

(Continued)

*Primary Examiner* — David H Malzahn
(74) *Attorney, Agent, or Firm* — Brundidge & Stanger, P.C.

(57) ABSTRACT

Technologies and implementations for representing floating-point numbers in an extensible language are generally disclosed.

31 Claims, 6 Drawing Sheets

(56) References Cited

OTHER PUBLICATIONS

Buswell, S., et al, The OpenMath Standard, The OpenMath Society, version 2.0, Jun. 2004, pp. 1-111.

United States Patent and Trademark Office, International search report and written opinion of the international searching authority for PCT/US2013/028593, mailed on May 13, 2013.

* cited by examiner

400 A computer program product

402 A signal bearing medium

404 at least one of machine-readable instructions, which, when executed by one or more processors, operatively enable an extensible language encoding module to:

determine a significand value based at least in part on the floating-point number;
determine an exponent value based at least in part on the floating-point number;
determine a base based at least in part on the floating-point number;
generate key-value pairs to represent the determined significand value, the determined exponent value, and the determined base;
encode the generated key-value pairs as a dictionary in the extensible language;
determine a fixed-width value based at least in part on the floating-point number;
generate a key-value pair to represent the determined fixed-width value;
determine a first precision value based at least in part on the determined significand value;
determine a second precision value based at least in part on the determined exponent value; or
generate key-value pairs to represent the determined first precision value and the determined second precision value.

406 a computer-readable medium

408 a recordable medium

410 a communications medium

FIG. 4

500 A computer program product

502 A signal bearing medium 504 at least one of machine-readable instructions, which, when executed by one or more processors, operatively enable an extensible language encoding module to:

receive a plurality of key-value pairs representing a floating-point number;
determine a significand value based at least in part on one or more of the plurality of the key-value pairs;
determine an exponent value based at least in part on one or more of the plurality of the key-value pairs;
determine a base based at least in part on one or more of the key-value pairs;
determine the floating-point number based at least in part on the determined significand, the determined exponent, and the determined base;
determine a fixed-width value based at least in part on one or more of the key-value pairs, and wherein determining the floating-point number includes determining the floating-point number based at least in part on the determined fixed-width value;
determine a first precision value based at least in part on one or more of the plurality of key-value pairs; or
determine a second precision value based at least in part on one or more of the plurality of key-value pairs; and wherein determining the floating-point number includes determining the floating-point number based at least in part on the determined first precision value and the determined second precision value.

| 506 a computer-readable medium | 508 a recordable medium | 510 a communications medium |

FIG. 5

IDEMPOTENT REPRESENTATION OF NUMBERS IN EXTENSIBLE LANGUAGES

CROSS-REFERENCE TO RELATED APPLICATION

The present application is a U.S. National Stage filing under 35 U.S.C. §371 of PCT Application No. PCT/US13/28593, filed on Mar. 1, 2013.

BACKGROUND

Unless otherwise indicated herein, the approaches described in this section are not prior art to the claims in this application and are not admitted to be prior art by inclusion in this section.

Extensible languages may be used to structure the representation of data in modern computing applications. For example, an array of data (e.g., strings, numbers, or the like) may be represented using an extensible language. Using extensible languages to structure the representation of data may provide a number of benefits. For example, compatibility between different computing applications may be facilitated. Additionally, some flexibility in future extensions or backwards compatibility with respect to using the data may be provided. Extensible languages may also allow for some amount of human readability of the data. In general, an extensible language may be used to represent various types of data (e.g., strings, numbers, or the like). However, the representation of some data types (e.g., strings and integers) may be idempotent, while the representation of other data types (e.g., floating-point numbers) may not be idempotent.

SUMMARY

Detailed herein are various illustrative methods for representing numbers in an extensible language. Example methods may include determining a significand value based at least in part on the floating-point number, determining an exponent value based at least in part on the floating-point number, determining a base based at least in part on the floating-point number, and generating key-value pairs to represent the determined significand value, the determined exponent value, and the determined base.

As another example, methods may include receiving a plurality of key-value pairs representing a floating-point number, determining a significand value based at least in part on one or more of the plurality of the key-value pairs, determining an exponent value based at least in part on one or more of the plurality of the key-value pairs, determining a base based at least in part on one or more of the key-value pairs, and determining the floating-point number based at least in part on the determined significand, the determined exponent, and the determined base.

The present disclosure also describes various example machine-readable non-transitory medium having stored therein instructions that, when executed by one or more processors, operatively enable an extensible language encoder module to: determine a significand value based at least in part on the floating-point number, determine an exponent value based at least in part on the floating-point number, determine a base based at least in part on the floating-point number, and generate key-value pairs to represent the determined significand value, the determined exponent value, and the determined base.

As another example, various machine-readable non-transitory medium having stored therein instructions that, when executed by one or more processors, operatively enable an extensible language encoder module to: receive a plurality of key-value pairs representing a floating-point number, determine a significand value based at least in part on one or more of the plurality of the key-value pairs, determine an exponent value based at least in part on one or more of the plurality of the key-value pairs, determine a base based at least in part on one or more of the key-value pairs, and determine the floating-point number based at least in part on the determined significand, the determined exponent, and the determined base.

The present disclosure additionally describes example systems for representing numbers in an extensible language. Example systems may include an extensible language encoding module, a machine readable medium having stored therein instructions that, when executed by one or more processors, operatively enable the extensible language encoding module to: determine a significand value based at least in part on the floating-point number, determine an exponent value based at least in part on the floating-point number, determine a base based at least in part on the floating-point number, and generate key-value pairs to represent the determined significand value, the determined exponent value, and the determined base.

As another example, systems may include an extensible language encoding module, a machine readable medium having stored therein instructions that, when executed by one or more processors, operatively enable the extensible language encoding module to: receive a plurality of key-value pairs representing a floating-point number, determine a significand value based at least in part on one or more of the plurality of the key-value pairs, determine an exponent value based at least in part on one or more of the plurality of the key-value pairs, determine a base based at least in part on one or more of the key-value pairs, and determine the floating-point number based at least in part on the determined significand, the determined exponent, and the determined base.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 4 illustrates an example computer program product;

FIG. 5 illustrates another example computer program product; and

DETAILED DESCRIPTION

Figure 1:
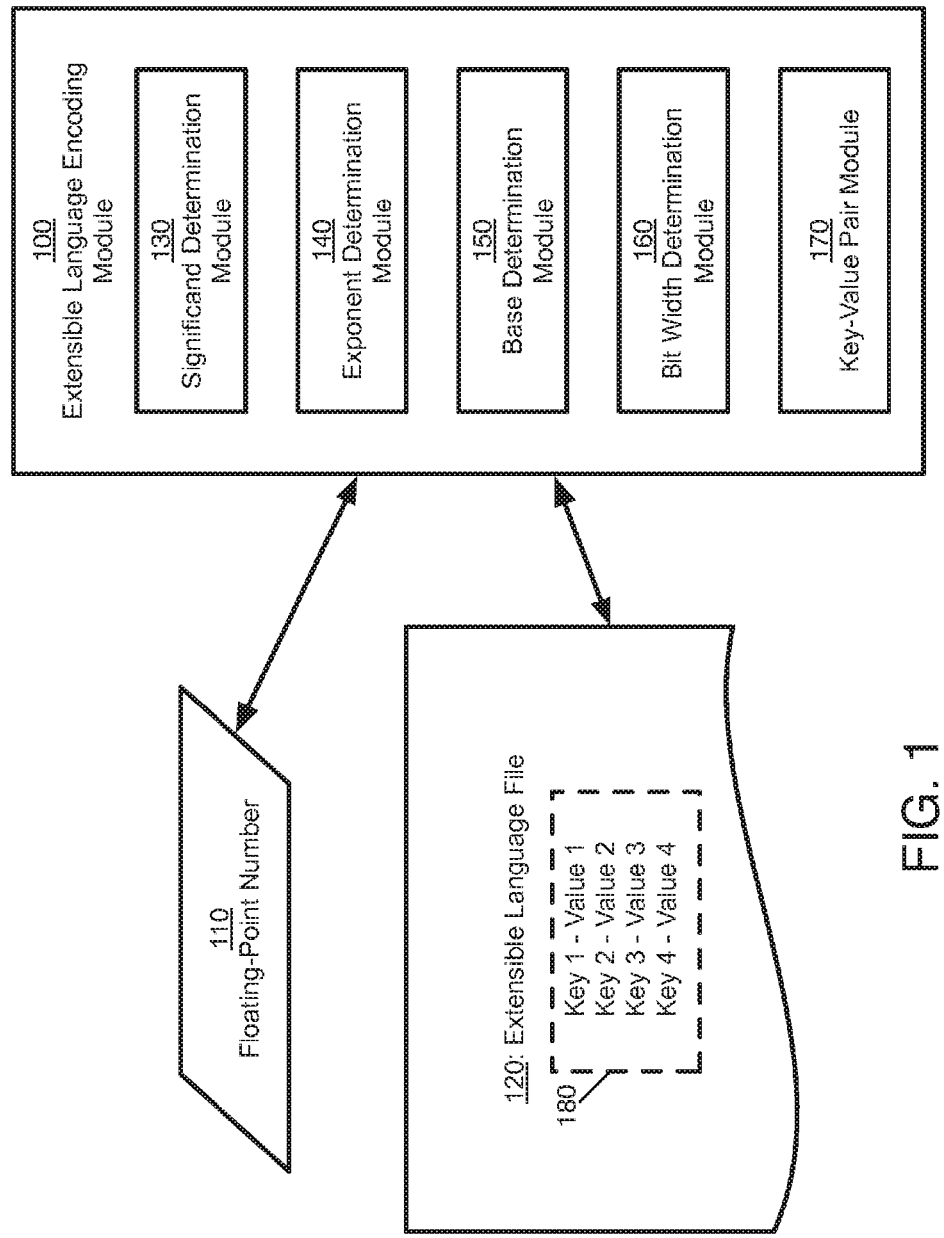
FIG. 1 illustrates a block diagram of an example extensible language encoding module.

The following description sets forth various examples along with specific details to provide a thorough understanding of claimed subject matter. It will be understood by those skilled in the art that claimed subject matter may be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, devices, systems and computer readable media related to representing numbers in an extensible language.

An extensible language (e.g., Extensible Markup Language (XML), JavaScript Object Notation (JSON), Extensible Hypertext Markup Language (XHTML), Extensible Scientific Interchange Language (XSIL), or the like) may be used to represent various types of data (e.g., strings, numbers, or the like). For example, an ordered sequence of numbers may be represented using an extensible language. As an alternate example, an extensible language may be used to represent data using key-value pairs. Representations using key-value pairs may be referred to as a "dictionary".

Extensible languages may be used to represent data for a variety of applications. For example, scientific experiment data (e.g., experiment name, parameters, results, equipment used, or the like) may be represented using extensible languages. In general, an extensible language may be used to represented data by encoding the data (e.g., text, values, or the like) based on the format of the extensible language. The data may then be read by a variety of different software applications. In general, the data may be read by decoding the data from the format for the particular extensible language used to represent the data. Additionally, new data (e.g., new experiment name, results, or the like) may be added (or existing data updated) by encoding the new (or updated) data into the extensible language format. By representing the scientific experiment data in an extensible language format, the scientific experiment data may reliably be transmitted and/or stored while preserving the original data (e.g., experiment name, parameters, results, equipment used, or the like).

Data (e.g., the scientific experiment data referenced above, or the like) may include various data types. For example, some of the data may be human language text (strings), while other of the data may be numbers. In general, encoding data into an extensible language may include encoding the data using a character-encoding standard (e.g., ISO 646, ISO 8859, Unicode, ASCII, or the like).

As will be appreciated, representing strings by encoding them using an ASCII based character-encoding standard may provide that the representation is idempotent. More specifically, the decoded data will remain identical to the original data even after repeatedly encoding and then decoding the data. For example, suppose that the data "Experiment 1" were represented in an extensible language. The data may be transmitted, stored, decoded, and/or re-encoded, a number of times and the data may still be "Experiment 1".

Although the representation of strings may be idempotent, the representation of all types of numbers may not be idempotent. More particularly, the representation of integer type number may be idempotent while the representation of floating-point type number may not be idempotent. For example, an integer (e.g., "0", "1", "2", or the like) may be reliably encoded and decoded into and from an extensible language (e.g., using the ASCII character encoding standard, or the like). However, encoding and decoding a floating-point number (e.g., "0.0125", "1.25", "12.5", or the like) from an extensible language (e.g., using the ASCII character encoding standard, or the like) may not be reliable. More specifically, when a floating-point number is encoded into an extensible language, the original format of the floating-point number (e.g., single-precision, double-precision, or the like) may be lost. As a result, upon decoding the number, it may not be possible to determine the original value.

Various embodiments of the present disclosure may provide for the idempotent representation of floating-point type numbers in an extensible language. The following non-limiting example is provided to illustrate various features or implementations of the present disclosure. Assuming that the floating-point number 1.25 were to be represented in an extensible language. The significand component, the exponent component, and the base of the floating-point number may be determined. For example, for the floating-point number 1.25, the significand may be 125, the exponent may be −2, and the base may be 10 (decimal). Additionally, a bit width of the floating-point number may be determined. For example, assume the floating-point number was specified as a binary32 type floating-point number, the fixed bit width may be determined as 32 bits.

The determined significand, exponent, base, and bit width may then be encoded into a dictionary (e.g., using key-value pair, or the like) in the extensible language. For example, a significand key, having a value of 125 may be generated. Similarly, an exponent key having a value of −2, a base key having a value of 10, and a bit width key having a value of 32 may also be generated. The key-value pairs may then be encoded into an extensible language format. As such, the floating-point number may be represented in the extensible language.

The floating-point number may be decoded from the extensible language by referencing the key-value pairs to determine the component parts of the floating-point number. For example, the value of the significand, exponent, base, and width may be determined from the dictionary in the extensible language. More particularly, the values may be determined by referencing the key associated with the significand, exponent, base, and width respectively. The floating-point number may then be determined from the component parts of the number as specified in the extensible language.

FIG. 1 illustrates a block diagram of an example extensible language encoding module 100, arranged in accordance with at least some embodiments of the present disclosure. In general, the extensible language encoding module 100 may be configured to encode and/or decode a floating-point number 110 into and/or from an extensible language file 120. As can be seen from this figure, the extensible language encoding module 100 may include a significand determination module 130, an exponent determination module 140, a base determination module 150, a bit width determination module 160, and a key-value pair module 170. In general, the modules 130-160 may be configured to determine various component parts of the floating-point number 110.

In some embodiments of the present disclosure, the floating-point number 110 (fp) may be represented by the following equation:

$$fp = sig \times base^{ex} \qquad [1]$$

The significand determination module 130 may be configured to determine the value of the significand (sig) of the floating-point number 110 based at least in part upon Equation 1. For example, if the floating-point number 110 equaled 1.25, Equation 1 may be used to represent the number as follows: $125 \times 10^{-2}$. As such, in some embodiments, the significand determination module 130 may determine the significand value as being equal to 125.

With some embodiments, the exponent determination module 140 may be configured to determine the value of the exponent (ex) of the floating-point number 110. For example, if the floating-point number 110 equaled $125 \times 10^{-2}$, the exponent determination module 140 may determine the exponent value as being equal to negative two (−2).

Similarly, in some embodiments, the base determination module 150 may be configured to determine the value of the base (base) of the floating-point number 110. For example, if the floating-point number 110 equaled $125 \times 10^{-2}$, the base determination module 150 may determine the base value as being equal to ten (10).

As will be appreciated, a variety of different techniques for manipulating floating-point numbers exist. For example, the IEEE Standard for Floating-Point Arithmetic (IEEE 754) standardizes a number of such techniques. The examples presented above, including Equation 1, are not intended to be limiting. As such, at least some embodiments of the present disclosure may determine the component parts of a floating-point number (e.g., significand, exponent, base, width, or the like) using techniques other than that described above in conjunction with Equation 1.

For example, a floating-point number may be described by an integer component and a fractional component. Again using 1.25 as the floating-point number, "1" may correspond to the integer component and "0.25" may correspond to the fractional component. Accordingly, with some embodiments of the present disclosure, the significand determination module 130 may determine the significand from the integer component (e.g., "1", or the like) and the exponent determination module may determine the exponent from the fractional component (e.g., 0.25), using, for example, techniques specified in the IEEE 754 standard. Additionally, in some embodiments of the present disclosure, the extensible language encoding module 100 may implement various conventions (e.g., base conversion, normalization, rounding, or the like) for encoding and/or decoding the floating-point number 110.

Additionally, a floating-point number may be described using a variety of different bases (e.g., binary, decimal, hexadecimal, or the like). In some embodiments, a particular base may be preferred. For example, binary "base 2" may be preferred over decimal "base 10" in some computing applications. Accordingly, the extensible language encoding module 100 may be configured to determine the component parts of the floating-point number 110 taking into account the preferred base. In some embodiments, this may require the floating-point number to be manipulated (e.g., using floating-point arithmetic, algebra, or the like) to determine the values of the significand and exponent for the corresponding base.

The bit width determination module 160 may be configured to determine the bit width of the floating-point number 110. In some embodiments of the present disclosure, the bit width determination module 160 may be configured to determine a fixed bit width of the floating-point number 110. For example, if the floating-point number 110 equaled $125 \times 10^{-2}$, and had a datatype of binary32, the bit width determination module 160 may determine the bit width as being equal to 32 bits. With some embodiments of the present disclosure, the bit width determination module 160 may be configured to determine the number of bits of precision of the floating-point number 110. For example, if the significand equaled 125 and the exponent equaled −2, the bit width determination module 160 may determine that the significand has 16 bits of precision and that the exponent also has 16 bits of precision.

The key-value pair module 170 may be configured to generate key-value pairs 180 to correspond to the determined component of the floating-point number 110. For example, a key-value pair 180 may be generated to correspond to the determine significand value. Accordingly, using the example above, the key may be "significand" and the value may be "125". Additionally, a key-value pair 180 may be generated to correspond to the determined exponent value, the determined base, and the determined width. For example, keys named "exponent", "base", and "width" with respective values "−2", "10", and "32", may be generated to correspond the determined exponent, base, and width.

As will be appreciated, floating-point numbers may be specified in a variety of different datatype format (e.g., binary16, binary32, binary64, binary128, decimal32, decimal64, decimal128, or the like). Furthermore, a variety of different techniques (e.g., IEEE 754, or the like) may be specified for determining bit width. For example, bit width may be determined on a fixed width basis. As another example, bit width may also be determined using a precision of the significand and exponent.

With some embodiments of the present disclosure, the extensible language encoding module 100 may be configured to determine the floating-point number 110 from the extensible language file 120. In general, the component parts (e.g., significand, exponent, base, or the like) of the floating-point number 110 may be determined from the key-value pairs 180. The floating-point number 110 may then be determined from the determined component parts.

In some embodiments, the key-value pair module 170 may be configured to facilitate determining a value associated with a particular key. For example, the key-value pair module 170 may determine "Value 1", corresponding to "Key 1" from the key-value pairs 180. The modules 130-160 may be configured to determine the specific component parts of the floating-point number 110 from the key-value pairs 180 using the key-value pair module 170. For example, the significand determination module 130 may determine the value of the significand from the key-value pairs 180 by requesting the value from the key-value pair module 170.

Given the values of the component parts of the floating-point numbers (e.g., as specified in the key-value pairs 180, or the like), the extensible language encoding module 100 may be configured to determine the floating-point number. For example, in some embodiments, Equation 1 may be employed to determine the value of the floating-point number 110.

In some embodiments, the extensible language encoding module 100 may be incorporated into a larger application. For example, a software application configured to work with extensible languages may incorporate the extensible language encoding module 100. With some embodiments, the extensible language encoding module 100 may be incorporated into a device configured to encode a floating-point number into an extensible language format. For example, a measurement device may include the extensible language encoding module 100. As such, data values measured using the measurement device may be encoded into an extensible language as floating-point numbers.

Figure 2:
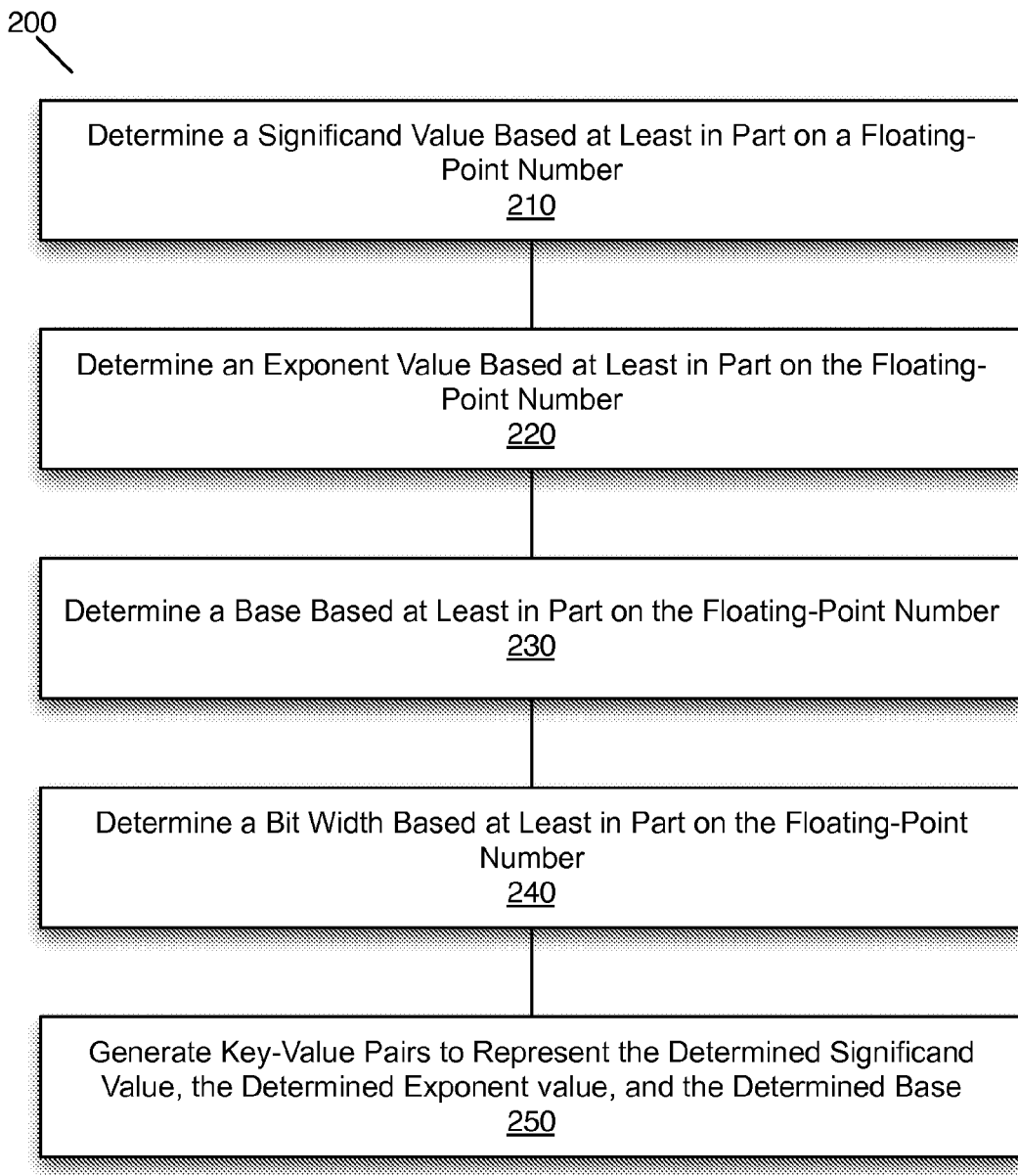
FIG. 2 illustrates a flow chart of an example method for encoding a floating-point number into an extensible language.
Figure 3:
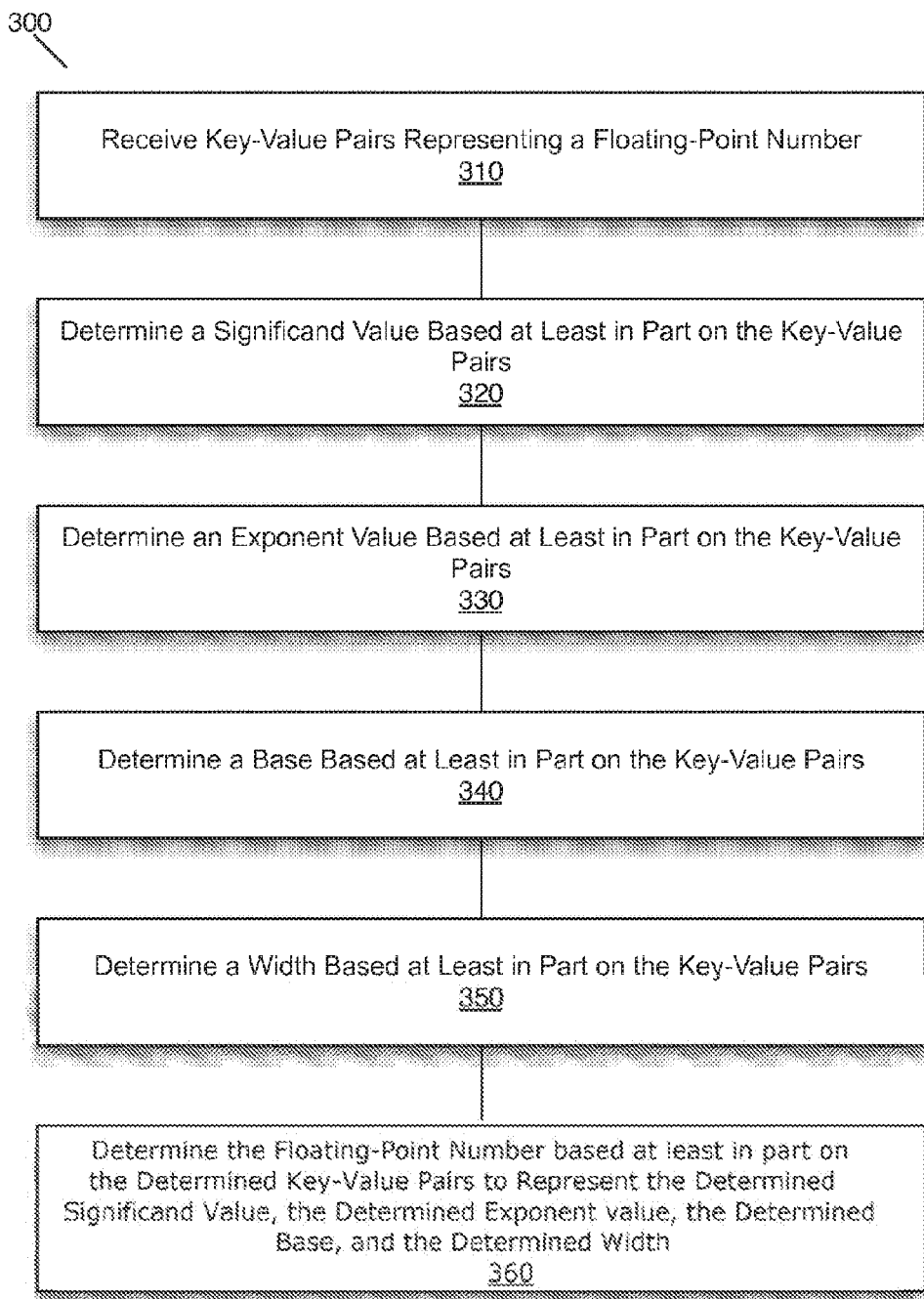
FIG. 3 illustrates a flow chart of another example method for decoding a floating-point number from an extensible language.

FIG. 2 illustrates a flow chart of an example method 200 for encoding a floating-point number into an extensible language file, arranged in accordance with at least some embodiments of the present disclosure. Similarly, FIG. 3 illustrates a method 300 for decoding a floating-point number from an extensible language file, arranged in accordance with at least some embodiments of the present disclosure. In some portions of the description, illustrative implementation of the methods 200 and 300 are described with reference to elements of the extensible language encoding module 100 depicted in FIG. 1. However, the described embodiments are not limited to this depiction. More specifically, some elements depicted in FIG. 1 may be omitted from example implementations of the methods detailed herein. Furthermore, other elements not depicted in FIG. 1 may be used to implement example methods.

Additionally, FIGS. 2 and 3 employ block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and others not described, rearrangements, substitutions, changes, modifications, etc., may be made without departing from the scope of claimed subject matter.

Turning now to the method 200 and FIG. 2, beginning at block 210, "Determine a Significand Value Based at Least in Part on a Floating-Point Number", the significand determination module may include logic and/or features configured to determine a significand of a floating-point number. In general, at block 210, the significand determination module 130 may determine the value of the significand of the floating-point number 110. In some embodiments, the significand determination module 130 may determine the value of the significand from Equation 1 as described above. In some embodiments of the present disclosure, the significand determination module 130 may determine the value of the significand base at least in part on the integer component of the floating-point number.

Continuing from block 210 to block 220, "Determine an Exponent Value Based at Least in Part on the Floating-Point Number", the exponent determination module 140 may include logic and/or features configured to determine an exponent of a floating-point number. In general, at block 220, the exponent determination module 140 may determine the value of the exponent of the floating-point number 110. In some embodiments, the exponent determination module 140 may determine the value of the exponent from the Equation 1 as described above. With some embodiments of the present disclosure, the exponent determination module 140 may be configured to determine an exponent value base at least in part on the fractional component of the floating-point number 110.

Continuing from block 220 to block 230, "Determine a Base Based at Least in Part on the Floating-Point Number", the base determination module 150 may include logic and/or features configured to determine a base of a floating-point number. In general, at block 230, the base determination module 150 may determine the value of the base of the floating-point number 110. In some embodiments, the base determination module 150 may determine the value of the base from Equation 1 as described above. As described above, a floating-point number (e.g., 1.25, or the like) may be described using a variety of different bases (e.g., binary, or the like). With some embodiments, the operations of block 210, 220, and 230 may be performed concurrently on in an order conducive to determining the component parts of the floating-point number 110. For example, in some embodiments, a particular base (e.g., binary, or the like) may be preferred. Accordingly, the extensible language encoding module 100 may be configured to determine the significand and exponent for the particular base.

Continuing from block 230 to block 240, "Determine a Bit Width Based at Least in Part on the Floating-Point Number", the bit width determination module 160 may include logic and/or features configured to determine a bit width for a floating-point number. In general, at block 240, the bit width determination module 160 may determine a bit width of the floating-point number 110. In some embodiments, the bit width determination module 160 may determine the bit width based on a fixed-width. For example, for a binary32 type floating-point number, the bit width may be determined as 32 bits. With some embodiments, the bit width determination module 160 may determine the bit width based on a precision of the floating-point number. For example, for a binary32 type floating-point number, the bit width of 23 bits for the significand and 8 bits for the exponent may be determined.

Continuing from block 240 to block 250, "Generate Key-Value Pairs to Represent the Determined Significand Value, the Determined Exponent value, and the Determined Base", the key-value pair module 170 may include logic and/or features configured to generate key-value pairs corresponding to the determine significand, exponent, base, and width. In general, at block 250, the key-value pair module 170 may generate key-value pairs 180 to correspond to the component parts of the floating-point number 110 (e.g., significand, exponent, base, width, or the like).

In some embodiments of the present disclosure, the key-value pair module 170 may be configured to generate keys according to a particular naming convention. For example, the keys may be named "significand, exponent, base and fixed-width or significand precision and exponent precision". As another example, the keys may be named "1-4" or "1-5" depending upon if there are four or five key-pairs. As still another example, the keys may be names "s", "e", "b" for the significand, exponent and base. For the bit width, the key name of "w" for fixed bit width or "xs" and "xe" for the bit width of the significand and exponent respectively may be used. These example key names are provided for illustrative purposes only and are not intended to be limiting.

With some embodiments, the values may be stored as integers. For example, the value of the significand and the exponent may be stored as integers. The values of the base and bit width may also be stored as integers. For example, the value "2" for the base key may signify a binary base (base 2). In some embodiments, a string may be use to signify the type of base. For example, a value of "b", "binary", or "bin" for the base key may signify a binary base (base 2). Similarly, a value of "h" or "hex" for the base key may signify a hexadecimal base (base 16). In some embodiments, the bit width may be stored as the logarithm base 2 of the actual bit width. For example, a bit width of 128 bits may be stored as the value "7".

In some embodiments, the extensible language encoding module 100 may be configured to encode the key-value pairs 180 in a dictionary in the extensible language file 120. With some embodiments, a dictionary specific to floating-point numbers may be used to encode the key-value pairs 180. For example, the extensible language file 120 may include a dictionary for floating-point datatypes and another dictionary for non-floating-point datatypes.

Turning now to the method 300 and FIG. 3, beginning at block 310, "Receive Key-Value Pairs Representing a Floating-point Number", the key-value pair module 170 may include logic and/or features configured to receive key-value pairs representing a floating-point number. In general, at block 310, the key-value pair module 170 may receive the key-value pairs 180. In some examples, the key-value pair module may access the dictionary of the extensible language file 120 (e.g., the main dictionary, a dictionary specific to floating-point datatypes, or the like).

Continuing from block 310 to block 320, "Determine a Significand Value Based at Least in Part on the Key-Value Pairs", the significand determination module 130 may include logic and/or features configured to determine the value of a significand for a floating-point number from key-value pairs. In general, at block 320, the significand determination module 103 may determine the value of the significand of the floating-point number 110 from the key-value pairs 180.

Continuing from block 320 to block 330, "Determine an Exponent Value Based at Least in Part on the Key-Value Pairs", the exponent determination module 140 may include logic and/or features configured to determine the value of an exponent for a floating-point number from key-value pairs. In general, at block 330, the exponent determination module 140 may determine the value of the exponent of the floating-point number 110 from the key-value pairs 180.

Continuing from block 330 to block 340, "Determine a Base Based at Least in Part on the Key-Value Pairs", the base determination module 150 may include logic and/or features configured to determine a base for a floating-point number from key-value pairs. In general, at block 340, the base determination module 150 may determine the base of the floating-point number 110 from the key-value pairs 180.

Continuing from block 340 to block 350, "Determine a Width Based at Least in Part on the Key-Value Pairs", the bit width determination module 160 may include logic and/or features configured to determine the bit width of a floating-point number from key-value pairs. In general, at block 350, the bit width determination module 160 may determine the bit width of the floating-point number 110 from the key-value pairs 180.

Continuing from block 350 to block 360, "Determine the Floating-Point Number based at least in part on the Determined Key-Value Pairs to Represent the Determined Significand Value, the Determined Exponent value, the Determined Base, and the Determined Width", the extensible language encoding module 100 may include logic and/or features configured to determine a floating-point number from component parts of the floating-point number. In general, at block 360, the extensible language encoding module 100 may determine the floating-point number 110 from the values represented in the key-value pairs 180. In some examples, the floating-point number may be determined using Equation 1 referenced above.

In general, the method described with respect to FIG. 2 and elsewhere herein may be implemented as a computer program product, executable on any suitable computing system, or the like. For example, a computer program product for encoding a floating-point number in an extensible language may be provided. Example computer program products are described with respect to FIG. 4 and elsewhere herein.

FIG. 4 illustrates an example computer program product 400, arranged in accordance with at least some embodiments of the present disclosure. The computer program product 400 may include machine-readable non-transitory medium having stored therein a plurality of instructions that, when executed, operatively enable an extensible language encoding module to encode a floating-point number in an extensible language according to the processes and methods discussed herein. The computer program product 400 may include a signal bearing medium 402. The signal bearing medium 402 may include one or more machine-readable instructions 404, which, when executed by one or more processors, may operatively enable a computing device to provide the functionality described herein. In various examples, the devices discussed herein may use some or all of the machine-readable instructions.

In some examples, the machine-readable instructions 404 may include determining a significand value based at least in part on the floating-point number. In some examples, the machine-readable instructions 404 may include determining an exponent value based at least in part on the floating-point number. In some examples, the machine-readable instructions 404 may include determining a base based at least in part on the floating-point number. In some examples, the machine-readable instructions 404 may include generating key-value pairs to represent the determined significand value, the determined exponent value, and the determined base. In some examples, the machine-readable instructions 404 may include encoding the generated key-value pairs as a dictionary in the extensible language. In some examples, the machine-readable instructions 404 may include determining a fixed-width value based at least in part on the floating-point number. In some examples, the machine-readable instructions 404 may include generating a key-value pair to represent the determined fixed-width value. In some examples, the machine-readable instructions 404 may include determining a first precision value based at least in part on the determined significand value. In some examples, the machine-readable instructions 404 may include determining a second precision value based at least in part on the determined exponent value. In some examples, the machine-readable instructions 404 may include generating key-value pairs to represent the determined first precision value and the determined second precision value.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, the signal bearing medium 402 may encompass a recordable medium 408, such as, but not limited to, memory, read/write (R/W) CDs, R/W DVDs, etc. In some implementations, the signal bearing medium 402 may encompass a communications medium 410, such as, but not limited to, a digital and/or an analog communication medium (e.g., a fiber optic cable, a waveguide, a wired communication link, a wireless communication link, etc.). In some examples, the signal bearing medium 402 may encompass a machine readable non-transitory medium.

In general, the method described with respect to FIG. 3 and elsewhere herein may be implemented as a computer program product, executable on any suitable computing system, or the like. For example, a computer program product for facilitating decoding a floating-point number from an extensible language may be provided. Example computer program products are described with respect to FIG. 5 and elsewhere herein.

FIG. 5 illustrates an example computer program product 500, arranged in accordance with at least some embodiments of the present disclosure. The computer program product 500 may include machine-readable non-transitory medium having stored therein a plurality of instructions that, when executed, operatively enable an extensible language encoding module to decode a floating-point number from an extensible language according to the processes and methods discussed herein. The computer program product 500 may include a signal bearing medium 502. The signal bearing medium 502 may include one or more machine-readable instructions 504, which, when executed by one or more processors, may operatively enable a computing device to provide the functionality described herein. In various examples, the devices discussed herein may use some or all of the machine-readable instructions.

In some examples, the machine-readable instructions 504 may include receiving a plurality of key-value pairs representing a floating-point number. In some examples, the machine-readable instructions 504 may include determining a significand value based at least in part on one or more of the plurality of the key-value pairs. In some examples, the machine-readable instructions 504 may include determining an exponent value based at least in part on one or more of the plurality of the key-value pairs. In some examples, the machine-readable instructions 504 may include determining a base based at least in part on one or more of the key-value pairs. In some examples, the machine-readable instructions 504 may include determining the floating-point number based at least in part on the determined significand, the determined exponent, and the determined base. In some examples, the machine-readable instructions 504 may include determining a fixed-width value based at least in part on one or more of the key-value pairs, and wherein determining the floating-point number includes determining the floating-point number based at least in part on the determined fixed-width value. In some examples, the machine-readable instructions 504 may include determining a first precision value based at least in part on one or more of the plurality of key-value pairs. In some examples, the machine-readable instructions 504 may include determining a second precision value based at least in part on one or more of the plurality of key-value pairs; and wherein determining the floating-point number includes determining the floating-point number based at least in part on the determined first precision value and the determined second precision value.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, the signal bearing medium 502 may encompass a recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communication link, a wireless communication link, etc.). In some examples, the signal bearing medium 502 may encompass a machine readable non-transitory medium.

In general, the method described with respect to FIGS. 2 and 3, and elsewhere herein may be implemented in any suitable server and/or computing system. Example systems may be described with respect to FIG. 6 and elsewhere herein. In general, the computer system may be configured to encode and/or decode a floating-point number into and/or from an extensible language.

Figure 6:
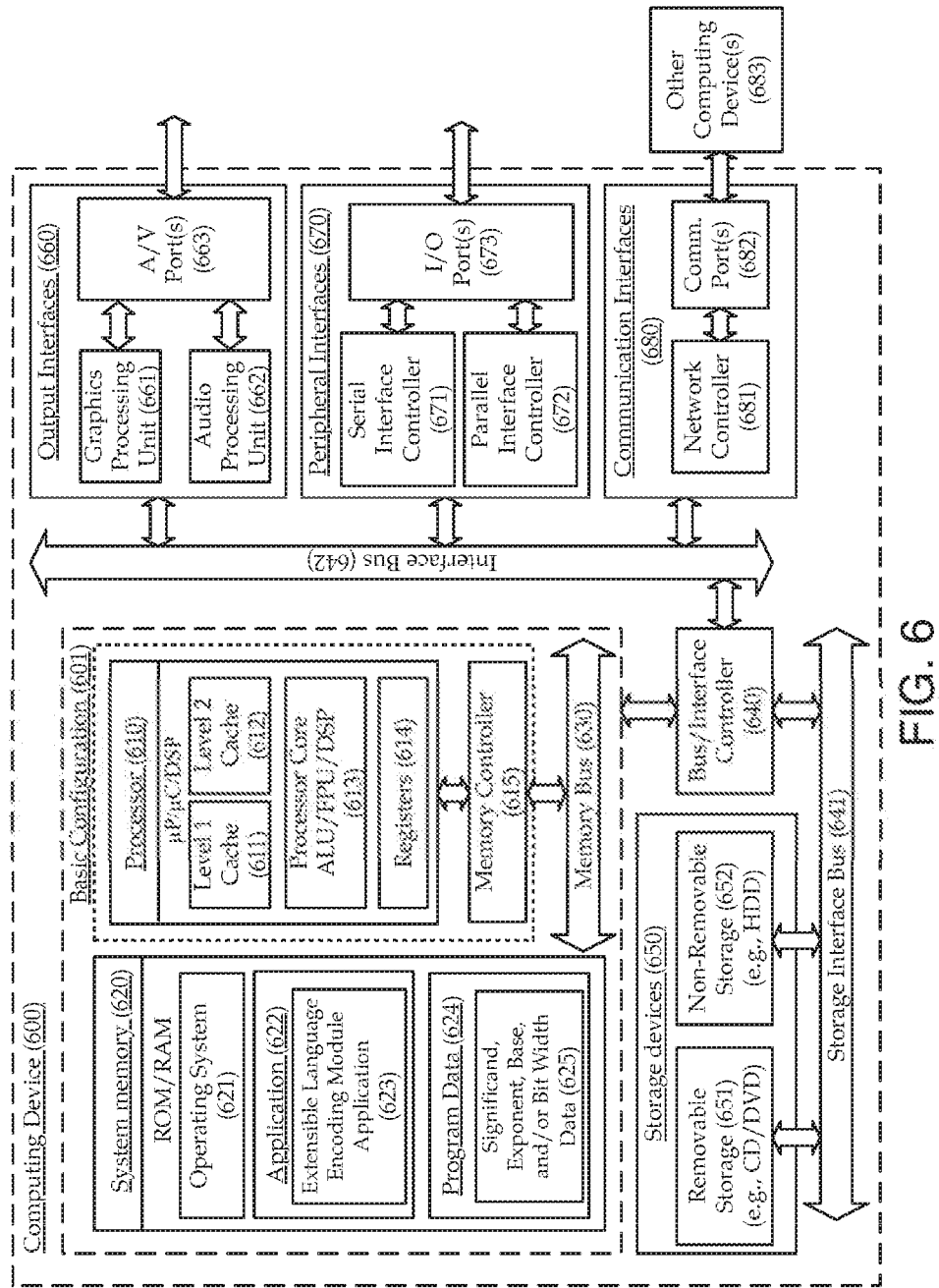
FIG. 6 illustrates a block diagram of an example computing device, all arranged in accordance with at least some embodiments of the present disclosure.

FIG. 6 is a block diagram illustrating an example computing device 600, arranged in accordance with at least some embodiments of the present disclosure. In various examples, the computing device 600 may be configured to facilitate channel-based communication via VIOP as discussed herein. In one example of a basic configuration 601, the computing device 600 may include one or more processors 610 and a system memory 620. A memory bus 630 can be used for communicating between the one or more processors 610 and the system memory 620.

Depending on the desired configuration, the one or more processors 610 may be of any type including but not limited to a microprocessor (µP), a microcontroller (µC), a digital signal processor (DSP), or any combination thereof. The one or more processors 610 may include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the one or more processors 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. The system memory 620 may include an operating system 621, one or more applications 622, and program data 624. The one or more applications 622 may include an extensible language encoding module application 623 that can be arranged to perform the functions, actions, and/or operations as described herein including the functional blocks, actions, and/or operations described herein. The program data 624 may include significand, exponent, base, and/or bit width data 625 for use with the extensible language encoding module application 623. In some example embodiments, the one or more applications 622 may be arranged to operate with the program data 624 on the operating system 621. This described basic configuration 601 is illustrated in FIG. 6 by those components within dashed line.

The computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The one or more data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 620, the removable storage 651 and the non-removable storage 652 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 600 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 600 may also be implemented as a personal computer including both laptop computer and non-laptop computer configurations. In addition, the computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to encode a floating-point number for use with an extensible language, the method comprising:
    determining a significand value based at least in part on the floating-point number;
    determining an exponent value based at least in part on the floating-point number;
    determining a base based at least in part on the floating-point number;
    determining a bit width of the floating point number, wherein the bit width represents a number of bits of precision of the floating point number;
    generating key-value pairs to represent the determined significand value, the determined exponent value, and the determined base; and
    encoding the generated key-value pairs as a dictionary in the extensible language.

2. The method of claim 1, wherein the dictionary only includes key-value pairs meant to be interpreted as floating-point numbers.

3. The method of claim 1, wherein determining a bit width of the floating point number comprises:
    determining a fixed-width value based at least in part on the floating-point number; and
    generating a key-value pair to represent the determined fixed-width value.

4. The method of claim 1, wherein determining a bit width of the floating point number comprises:
    determining a first precision value based at least in part on the determined significand value;
    determining a second precision value based at least in part on the determined exponent value; and
    generating key-value pairs to represent the determined first precision value and the determined second precision value.

5. The method of claim 1, wherein the value of the generated key-value pairs representing the determined significand value and the determined exponent value are integers.

6. The method of claim 1, wherein the value of the generated key-value pair representing the determined base is a string.

7. The method of claim 1, wherein the extensible language is Extensible Markup Language (XML).

8. The method of claim 1, wherein the extensible language is Java Script Object Notation (JSON).

9. A machine readable non-transitory medium having stored therein instructions that, when executed by one or more processors, operatively enable an extensible language encoder module to:
    determine a significand value based at least in part on the floating-point number;
    determine an exponent value based at least in part on the floating-point number;
    determine a base based at least in part on the floating-point number;
    determine a bit width of the floating point number, wherein the bit width represents a number of bits of precision of the floating point number; and
    generate key-value pairs to represent the determined significand value, the determined exponent value, and the determined base; and
    encode the generated key-value pairs as a dictionary in the extensible language, wherein the dictionary only includes key-value pairs meant to be interpreted as floating-point numbers.

10. The machine readable non-transitory medium of claim 9, wherein the stored instructions to determine a bit width of the floating point number further comprise instructions that, when executed by one or more processors, further operatively enable the communication module to:
    determine a fixed-width value based at least in part on the floating-point number; and
    generate a key-value pair to represent the determined fixed-width value.

11. The machine readable non-transitory medium of claim 9, wherein the stored instructions to determine a bit width of the floating point number further comprise instructions that, when executed by one or more processors, further operatively enable the communication module to:
    determine a first precision value based at least in part on the determined significand value;
    determine a second precision value based at least in part on the determined exponent value; and
    generate key-value pairs to represent the determined first precision value and the determined second precision value.

12. The machine readable non-transitory medium of claim 9, wherein the value of the generated key-value pairs representing the determined significand value and the determined exponent value are integers.

13. The machine readable non-transitory medium of claim 9, wherein the value of the generated key-value pair representing the determined base is a string.

14. The machine readable non-transitory medium of claim 9, wherein the extensible language is Extensible Markup Language (XML).

15. The machine readable non-transitory medium of claim 9, wherein the extensible language is Java Script Object Notation (JSON).

16. A system comprising:
    an extensible language encoding module including an extensible language in Java Script Object Notation (JSON);
    a machine readable medium having stored therein instructions that, when executed by one or more processors, operatively enable the extensible language encoding module to:

determine a significand value based at least in part on the floating-point number;

determine an exponent value based at least in part on the floating-point number;

determine a base based at least in part on the floating-point number;

determine a bit width of the floating point number, wherein the bit width represents a number of bits of precision of the floating point number; and generate key-value pairs to represent the determined significand value, the determined exponent value, and the determined base.

17. The system of claim 16, wherein the stored instructions that, when executed by one or more processors, further operatively enable the extensible language encoding module to encode the generated key-value pairs as a dictionary in the extensible language.

18. The system of claim 17, wherein the dictionary only includes key-value pairs meant to be interpreted as floating-point numbers.

19. The system of claim 16, wherein the stored instructions to determine a bit width of the floating point number further comprise instructions that, when executed by one or more processors, further operatively enable the extensible language encoding module to:

determine a fixed-width value based at least in part on the floating-point number; and generate a key-value pair to represent the determined fixed-width value.

20. The system of claim 16, wherein the stored instructions to determine a bit width of the floating point number further comprise instructions that, when executed by one or more processors, further operatively enable the extensible language encoding module to:

determine a first precision value based at least in part on the determined significand value;

determine a second precision value based at least in part on the determined exponent value; and generate key-value pairs to represent the determined first precision value and the determined second precision value.

21. The system of claim 16, wherein the value of the generated key-value pairs representing the determined significand value and the determined exponent value are integers.

22. The system of claim 16, wherein the value of the generated key-value pair representing the determined base is a string.

23. A method for decoding a floating-point number from an extensible language, the method comprising:

receiving a plurality of key-value pairs representing a floating-point number wherein the plurality of key-value pairs are encoded as a dictionary in the extensible language;

determining a significand value based at least in part on one or more of the plurality of the key-value pairs;

determining an exponent value based at least in part on one or more of the plurality of the key-value pairs;

determining a base based at least in part on one or more of the key-value pairs;

determining a bit width based at least in part on one or more of the plurality of the key-value pairs; and determining the floating-point number based at least in part on the determined significand, the determined exponent, and the determined base.

24. The method of claim 23, wherein the dictionary only includes key-value pairs meant to be interpreted as floating-point numbers.

25. The method of claim 23, wherein determining a bit width of the floating point number comprises:

determining a fixed-width value based at least in part on one or more of the key-value pairs, and wherein determining the floating-point number includes determining the floating-point number based at least in part on the determined fixed-width value.

26. The method of claim 23, wherein determining a bit width of the floating point number comprises:

determining a first precision value based at least in part on one or more of the plurality of key-value pairs;

determining a second precision value based at least in part on one or more of the plurality of key-value pairs; and wherein determining the floating-point number includes determining the floating-point number based at least in part on the determined first precision value and the determined second precision value.

27. A machine readable non-transitory medium having stored therein instructions that, when executed by one or more processors, operatively enable an extensible language encoder module to:

receive a plurality of key-value pairs representing a floating-point number wherein the plurality of key-value pairs are encoded as a dictionary;

determine a significand value based at least in part on one or more of the plurality of the key-value pairs;

determine an exponent value based at least in part on one or more of the plurality of the key-value pairs;

determine a base based at least in part on one or more of the key-value pairs;

determine a bit width based at least in part on one or more of the plurality of the key-value pairs; and determine the floating-point number based at least in part on the determined significand, the determined exponent, and the determined base.

28. The machine readable non-transitory medium of claim 27, wherein the dictionary only includes key-value pairs meant to be interpreted as floating-point numbers.

29. The machine readable non-transitory medium of claim 27, wherein the stored instructions to determine a bit width of the floating point number further comprise instructions that, when executed by one or more processors, further operatively enable the communication module to:

determine a fixed-width value based at least in part on one or more of the key-value pairs, and wherein determining the floating-point number includes determining the floating-point number based at least in part on the determined fixed-width value.

30. The machine readable non-transitory medium of claim 27, wherein the stored instructions to determine a bit width of the floating point number further comprise instructions that, when executed by one or more processors, further operatively enable the communication module to:

determine a first precision value based at least in part on one or more of the plurality of key-value pairs;

determine a second precision value based at least in part on one or more of the plurality of key-value pairs; and wherein determining the floating-point number includes determining the floating-point number based at least in part on the determined first precision value and the determined second precision value.

31. A system comprising:

an extensible language encoding module;

a machine readable medium having stored therein instructions that, when executed by one or more processors, operatively enable the extensible language encoding module to:

receive a plurality of key-value pairs representing a floating-point number wherein the plurality of key-value pairs are encoded as a dictionary;

determine a significand value based at least in part on one or more of the plurality of the key-value pairs;

determine an exponent value based at least in part on one or more of the plurality of the key-value pairs;

determine a base based at least in part on one or more of the key-value pairs;

determine a bit width based at least in part on one or more of the plurality of the key-value pairs; and determine the floating-point number based at least in part on the determined significand, the determined exponent, and the determined base.

* * * * *